(12) United States Patent
Herndon et al.

(10) Patent No.: US 7,423,839 B2
(45) Date of Patent: Sep. 9, 2008

(54) LOW POWER SUPPORT PADS FOR MOMENT LOADING AND ASSOCIATED METHODS

(75) Inventors: Troy M. Herndon, San Jose, CA (US); Christopher M. Woldemar, Santa Cruz, CA (US); Jose L. Cordova, San Jose, CA (US); Alan L. Grantz, Aptos, CA (US); Norbert S. Parsoneault, Scotts Valley, CA (US)

(73) Assignee: Seagate Technology LLC, Scotts Valley, CA (US)

( * ) Notice: Subject to any disclaimer, the term of this patent is extended or adjusted under 35 U.S.C. 154(b) by 579 days.

(21) Appl. No.: 11/084,758

(22) Filed: Mar. 18, 2005

(65) Prior Publication Data
US 2005/0219742 A1 Oct. 6, 2005

Related U.S. Application Data

(60) Provisional application No. 60/554,960, filed on Mar. 19, 2004.

(51) Int. Cl.
*G11B 17/02* (2006.01)
(52) U.S. Cl. .................................................. 360/99.08
(58) Field of Classification Search ............... 360/99.08
See application file for complete search history.

(56) References Cited

U.S. PATENT DOCUMENTS

| | | | | |
|---|---|---|---|---|
| 6,920,013 B2* | 7/2005 | Nishimura et al. | ....... | 360/99.08 |
| 6,925,715 B2* | 8/2005 | Ramsdell | ................. | 29/898.07 |
| 7,016,157 B1* | 3/2006 | Williams et al. | ......... | 360/265.7 |
| 7,035,051 B1* | 4/2006 | Coon | ....................... | 360/245.9 |
| 2002/0074880 A1* | 6/2002 | Tae Young | .................... | 310/90 |
| 2002/0185925 A1* | 12/2002 | Yoshikawa et al. | ........ | 310/67 R |
| 2003/0185472 A1* | 10/2003 | Aiello | ........................ | 384/107 |
| 2004/0008912 A1* | 1/2004 | Gomyo et al. | .............. | 384/100 |
| 2004/0076351 A1* | 4/2004 | Grantz et al. | ............... | 384/119 |
| 2004/0181933 A1* | 9/2004 | Detjens et al. | ........... | 29/603.03 |
| 2005/0074191 A1* | 4/2005 | Braun et al. | ................ | 384/100 |
| 2006/0126977 A1* | 6/2006 | Tamaoka | .................... | 384/100 |
| 2006/0140522 A1* | 6/2006 | Dittmer et al. | ............. | 384/100 |
| 2007/0076990 A1* | 4/2007 | Tsai et al. | ................... | 384/100 |

* cited by examiner

*Primary Examiner*—Allen T Cao
(74) *Attorney, Agent, or Firm*—Novak Druce & Quigg LLP (57) ABSTRACT

In one aspect, a fluid dynamic bearing system is provided. The system may include a first member and a second member disposed for relative rotation about an axis of rotation and having opposing substantially planar surfaces defining an axial gap. A bearing region is disposed circumferentially around the axis of rotation and a relatively large gap region is disposed circumferentially around the bearing region, the large gap region having an average gap distance greater than the bearing region. The large gap region further includes at least one support pad forming a localized narrow gap distance in the axial gap to provide support between the opposed surfaces at a radial distance greater than the bearing region. For example, the support pad may support the surfaces against an externally applied force or moment that may tilt one member relative to the other.

20 Claims, 6 Drawing Sheets

LOW POWER SUPPORT PADS FOR MOMENT LOADING AND ASSOCIATED METHODS

RELATED APPLICATION

The present application is related to and claims benefit of priority from U.S. Provisional Patent Application No. 60/554,960, filed on Mar. 19, 2004, which is incorporated by reference as if fully set forth herein.

BACKGROUND

1. Field

Various examples described herein relate generally to features for preventing or reducing damage due to forces and moment loads applied to a motor hub within a motor system, and in particular, support pads for supporting portions of a motor against forces and moment loads.

2. Description of Related Art

Magnetic disc drives are used for magnetically storing information. In a magnetic disc drive, a magnetic disc rotates at high speed and a transducing head "flies" over a surface of the disc. This transducing head records information on the disc surface by impressing a magnetic field on the disc. Information is read back using the head by detecting magnetization of the disc surface. The transducing head is moved radially across the surface of the disc so that different data tracks can be read back.

Over the years, storage density has tended to increase and the size of the storage system has tended to decrease. This trend has led to greater precision and lower tolerance in the manufacturing and operating of magnetic storage discs. For example, to achieve increased storage densities the transducer head is placed increasingly close to the surface of the storage disc to track increasingly densely positioned data tracks. As the density of the data tracks increases it is generally desired that the disc rotate substantially in a single plane with reduced run-out. A slight wobble or non-repeatable run-out in disc rotation can limit track spacing to account for misreads by the transducer head, thereby lowering track density. Accordingly, it is desired to reduce and minimize non-repeatable run-out in the system.

From the foregoing discussion, it can be seen that the stability of the motor and bearing assembly supporting the storage disc is of importance. One typical bearing assembly includes a fluid dynamic bearing. A fluid dynamic bearing provides a lubricating fluid such as gas or a liquid in a bearing gap between a fixed member and a rotating member. In one exemplary bearing assembly, a hub attached to a shaft is rotatably mounted with a sleeve, where bearing regions are included in a radial gap between the shaft and the sleeve as well as in an axial gap between planar surfaces of the sleeve and hub. Moment loads as a result of various conditions or events such as operational shock, disc installation, clamp installation, clamp/screw installation, and the like, may cause stress on the joint between the hub and shaft. Stress on the hub/shaft joint due to such a moment load during relative rotation or otherwise may result in several deleterious effects on the motor including, for example, instability of the bearing assembly support system. In particular, a moment load may pass through the hub/shaft joint and cause temporary or permanent changes in the hub/shaft joint or the bearings leading to run-out accuracy (TIR) changes relative to the axis of rotation, or the like.

Accordingly, devices and methods for supporting a hub (or other motor member) from external forces and reducing the potential for change or damage to the operation of the motor resulting from an external force are desired.

SUMMARY

In one aspect, a fluid dynamic bearing system is provided. In one example, a fluid dynamic bearing system includes a first member and a second member disposed for relative rotation about an axis of rotation and having opposing substantially planar surfaces defining an axial gap therebetween, the axial gap having an outer radius. A bearing region is disposed circumferentially around the axis of rotation and a relatively large gap region is disposed circumferentially around the bearing region, the large gap region generally having an average gap distance greater than the average gap distance of the bearing region. The large gap region further includes at least one localized narrow gap region or support pad to provide a localized narrow gap within the large gap region that provides a support to the opposed surfaces at a radial distance greater than the bearing region. For example, the support pad may support the surfaces against an externally applied force or moment that may tilt one member relative to the other.

In one example, multiple support pads are disposed circumferentially around the axis of rotation. Further, the support pads may be disposed near or adjacent a maximum radial distance of the gap.

In another aspect, a fluid dynamic bearing motor comprises a hub and sleeve disposed for relative rotation about an axis of rotation and having opposing substantially planar surfaces defining an axial gap therebetween. At least one groove is disposed on one of the opposing planar surfaces to form a bearing region, the at least one groove extending to a first radius from the axis of rotation. Further, a large gap region in the gap is disposed at a radial distance greater than the first radius, the large gap region including at least one support pad providing a localized narrow gap in the large gap region.

In another aspect, an exemplary method for manufacturing a fluid dynamic bearing system including support pads is provided. In one example, the support pads are machined, for example, by an Electro Chemical Machine "ECM" process into one of the opposing surfaces, e.g., the sleeve and/or the hub. The portions machined away are associated with a relatively large gap distance, and thus low power, whereas the remaining support pad region(s) are associated with a narrow gap distance. Accordingly, selectively placing support pads will reduce deflection of the hub with relatively low power consumption compared to a continuous circumferential ring, for example.

The present invention and its various embodiments are better understood upon consideration of the detailed description below in conjunction with the accompanying drawings and claims.

BRIEF DESCRIPTION OF THE DRAWINGS

For a fuller understanding of aspects and examples disclosed herein, reference is made to the accompanying drawings in the following description.

DETAILED DESCRIPTION

The following description is presented to enable a person of ordinary skill in the art to make and use various aspects of the inventions. Descriptions of specific materials, techniques, and applications are provided only as examples. Various modifications to the examples described herein will be readily apparent to those skilled in the art, and the general principles defined herein may be applied to other examples and applications without departing from the spirit and scope of the inventions. For example, aspects and examples may be employed in a variety of motors, including motors for use in disc storage drives. Motors for disc storage drives may be designed and may operate in a number of ways. The exemplary motors and other exemplary subject matter provided herein are for illustrating various aspects and are not intended to limit the range of motors and devices in which such examples and aspects may be applied.

One method of reducing the effect of a moment load applied to a motor hub, and in particular, the stress on the hub/shaft joint, includes supporting the hub by a tight or relatively small axial gap between the hub and relatively rotating sleeve surface. For example, a narrow gap region may be used near the outer radius of the sleeve (generally outside the bearing thrust region) and extending continuously around the center of axis to provide support to the hub when a moment force is applied. Generally, increasing the radial distance of the narrow gap region from the shaft/hub joint provides increased support against an external moment on the hub. As the gap distance between the hub and sleeve is reduced, however, the power consumed during operation increases. Thus, design considerations and trade-offs are generally made between a high power narrow gap region and the desired support for the hub to withstand a moment load.

Accordingly, one exemplary system provided herein includes low power support pads disposed within an axial gap of a fluid dynamic bearing system. Broadly speaking, a large gap region may be included outside a bearing region in an axial gap disposed between two substantially planar opposing surfaces (where the large gap region has an average gap distance greater than an average gap distance of the bearing region) to reduce power consumption of the motor. Additionally, one or more localized narrow gap portions or "support pads" are included in the large gap region, at a radial distance greater than the bearing region and near or adjacent the outer radius of the sleeve, to provide support between the opposing planar surfaces during a moment load applied to the hub, for example. Accordingly, the relatively large gap region near the outer radial portion of the axial gap reduces power consumption while localized support pads provide a narrow gap distance to support and protect against external moment loads.

Figure 1:
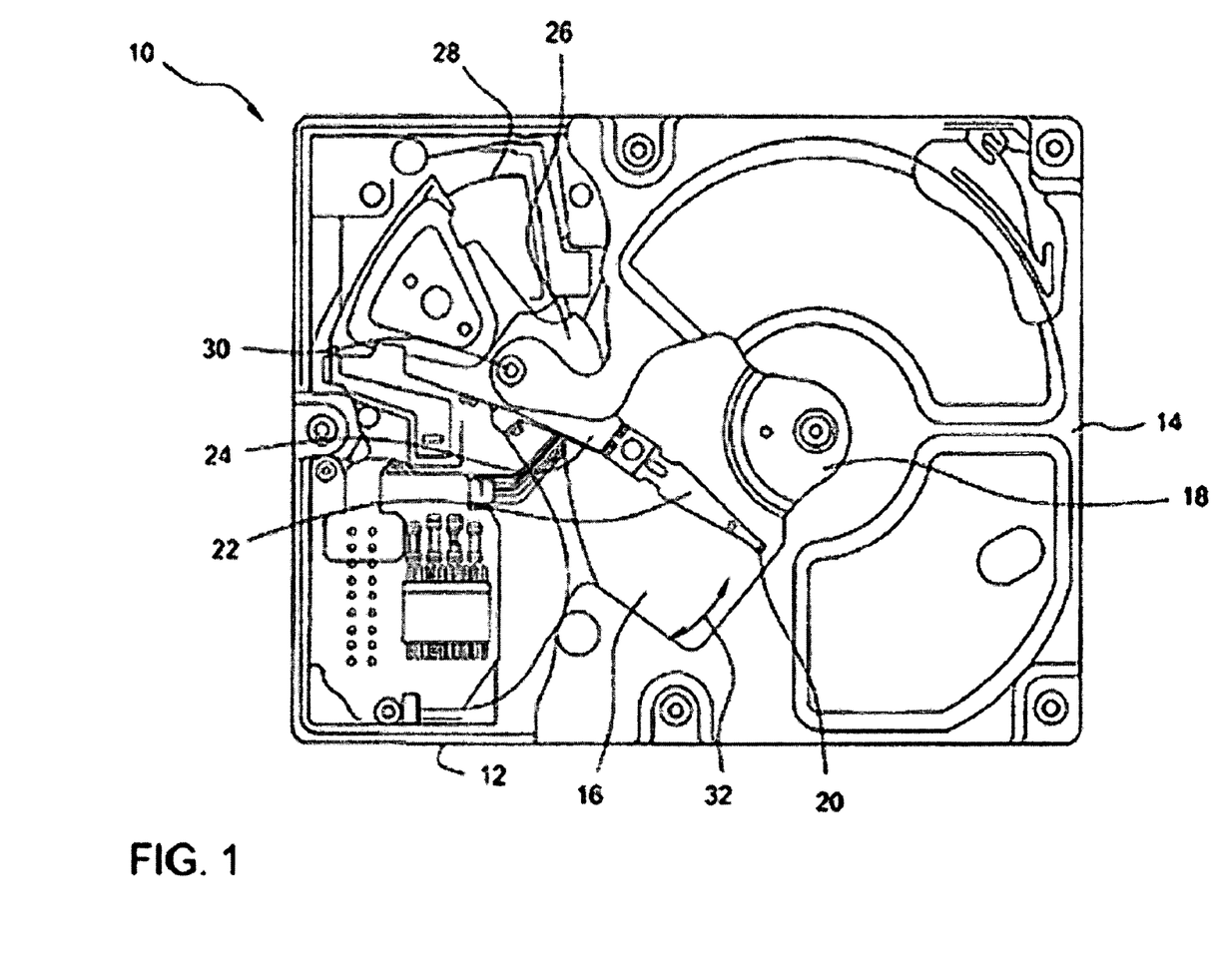
FIG. 1 illustrates a plan view of an exemplary disc drive having a spindle motor.

Turning briefly to FIG. 1, a plan view of an exemplary disk drive 10 for use with various aspects described herein is shown. The disk drive 10 includes a housing base 12 and a top cover 14. The housing base 12 is combined with top cover 14 to form a sealed environment to protect the internal components from contamination by elements outside the sealed environment. Disk drive 10 further includes a disk pack 16 that is mounted on a hub 202 (see FIG. 2a) for rotation on a spindle motor 200 (see FIG. 2a) by a disk clamp 18. Disk pack 16 includes one or more individual disks that are mounted for co-rotation about a central axis. Each disk surface has an associated read/write head 20 that is mounted to the disk drive 10 for communicating with the disk surface. In the example shown in FIG. 1, read/write heads 20 are supported by flexures 22 that are in turn attached to head mounting arms 24 of an actuator 26. The actuator shown in FIG. 1 is of the type known as a rotary moving coil actuator and includes a voice coil motor (VCM), shown generally at 28. Voice coil motor 28 rotates actuator 26 with its attached read/write heads 20 about a pivot shaft 30 to position read/write heads 20 over a desired data track along a path 32. The general configuration and arrangement of disk drive 10 shown in FIG. 1 is illustrative only, and other arrangements of the various components have frequently been used, and aspects provided are not limited by the particular configuration of disk drive 10 shown.

To produce rotation of discs 16, spindle motor 200 typically includes at least one rotatable portion. The at least one rotatable portion in turn typically interfaces with one or more stationary, non-rotating portions. The stationary and rotatable portions generally include opposing surfaces (e.g., radial and/or axial opposing surfaces), which form gaps (e.g., radial and/or axial gaps) that may include journal and/or thrust hydrodynamic bearings. Hydrodynamic bearings typically incorporate liquid lubricants, such as oil in the gaps between the stationary portion(s) and rotatable portion(s) as is known in the art.

Figure 2A:
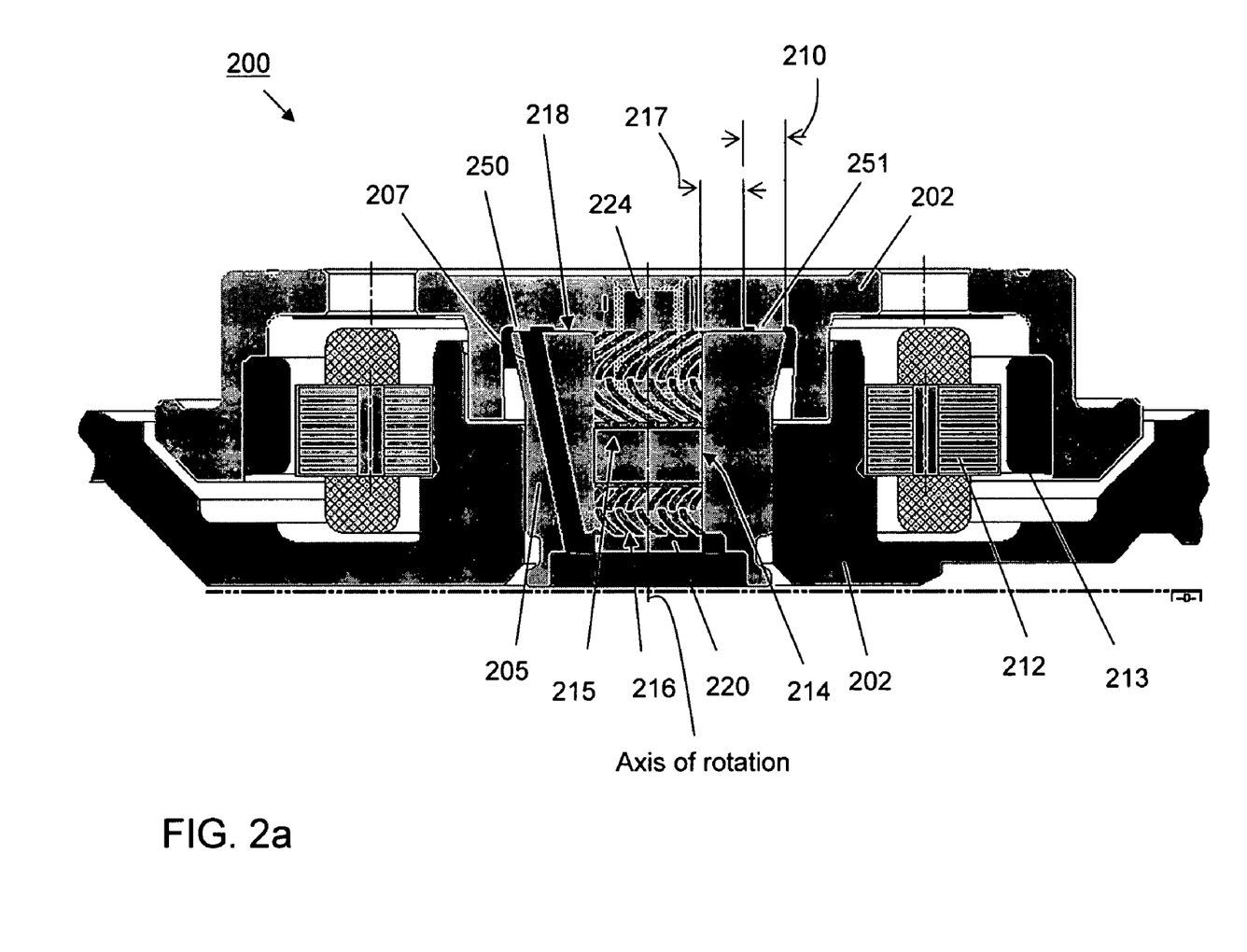
FIG. 2a illustrates a side view of a portion of an exemplary motor including exemplary support pads.
Figure 2B:
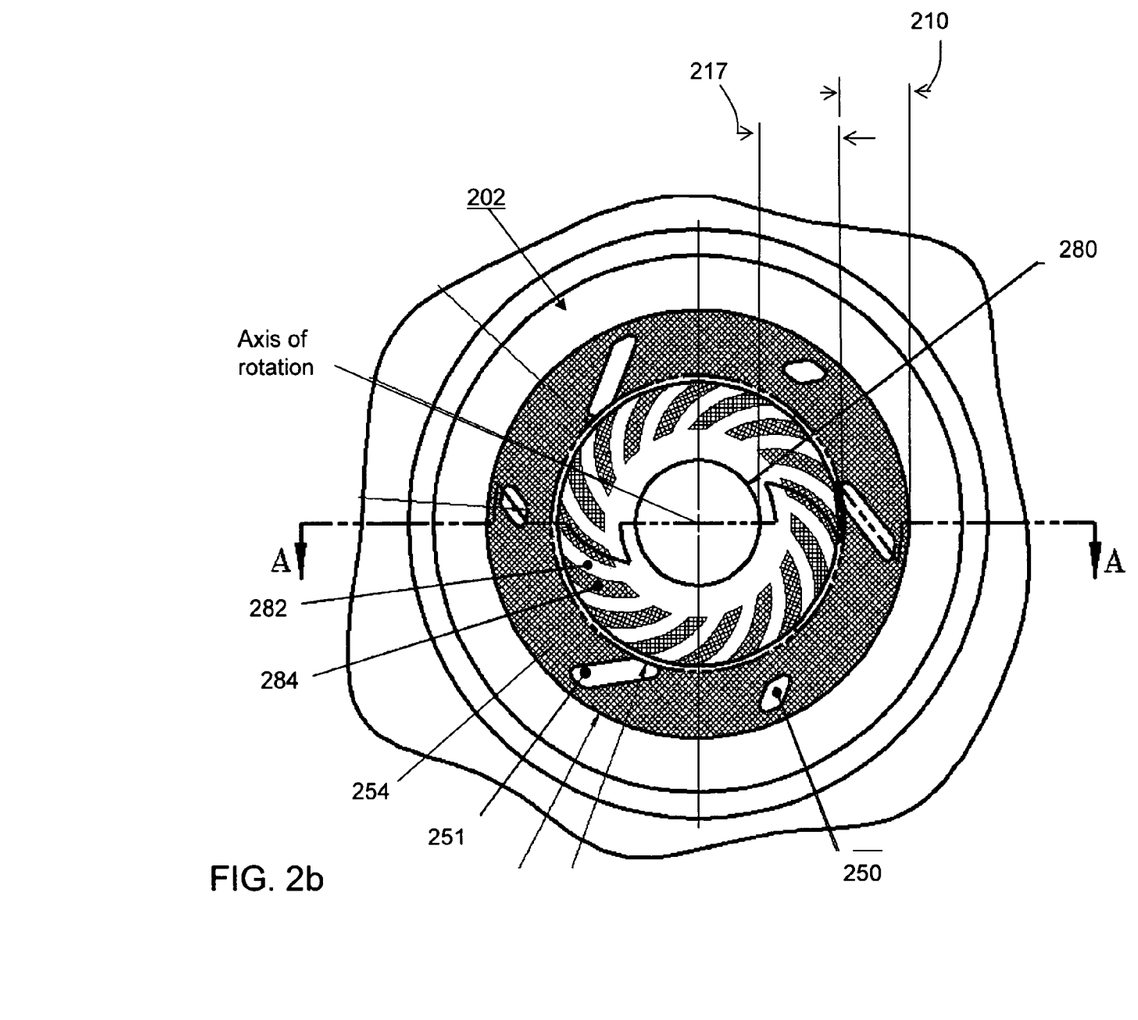
FIG. 2b illustrates a plan view of a hub having a thrust bearing surface and a plurality of support pads.

Reference is now made to FIGS. 2a and 2b, which illustrate different views of a portion of spindle motor 200 and are preferably referenced in combination. In particular, FIG. 2a illustrates a portion of an exemplary spindle motor 200 including low power support pads 250, 251 and FIG. 2b illustrates a surface of hub portion 202 including support pads 250, 251 according to one example.

In this example, motor 200 comprises a stationary portion including sleeve 205 and a rotatable portion including shaft 220 and hub 202. In particular, shaft 220 is fixed with respect to hub 202 via screw support 224, all of which rotate in combination with respect to sleeve 205. Rotation is achieved in this particular example through stator 212 that, when energized, communicates with a magnet associated with hub 202 and induces rotation of hub 202 and shaft 220 about stationary sleeve 205. Stator 212 comprises a plurality of "teeth" (not shown) formed of a magnetic material where each of the teeth is wound with a winding or wire. The configuration of motor 200, including rotating and stationary portions, is illustrative only; those of ordinary skill in the art will recognize that various other configurations of motor 200 are possible. Further, various features of motor 200, such as recirculation channels, capillary seals, and the like, have been omitted from the description for illustrative purposes.

An inner radial surface of sleeve 205 and outer radial surface of shaft 220 form a radial gap 214 therebetween, where one or both of the radial surfaces may include circumferentially disposed groove regions 215 and 216. Groove region 215 and/or groove region 216 may be asymmetrical and may function as pumping seals and/or to recirculate lubricating liquid through portions of motor 200, e.g., recirculation channel 207.

Additionally, the upper planar surface of sleeve 205 and opposing lower planar surface of hub 202 form an axial gap 218 therebetween, which includes at least one groove corresponding to a bearing region 217 (e.g., a thrust bearing) and support pads 250, 251. The at least one groove of groove region 217 may be disposed on one or both of the opposing surfaces to create a pressure gradient in the lubricant, for example.

It should be noted that "planar surface" as used herein generally indicates a substantially planar surface (as opposed to a radial surface), and may include various groove patterns, etchings, relief patterns, and the like as described herein.

Accordingly, a surface including various recessed and elevated portions to form bearing regions, support pads, and the like is substantially planar as used herein.

If a force is applied to hub 202, e.g., near the outer edge of hub 202, the joint between shaft 220 and hub 202 may be stressed due to the applied moment at the joint. The moment may lead to possible misalignment or failure of motor 200 as described above. Accordingly, support pads 250, 251 are disposed in axial gap 218 between the opposing axial surfaces of hub 202 and sleeve 205 to support against such an external moment load.

In particular, axial gap 218 positioned between opposing surfaces of hub 202 and sleeve 205 includes bearing region 217, which may provide flow and circulation of lubricant as is known in the art. Outside of the bearing region 217, e.g., at a radial distance greater than bearing region 217 and indicated generally as large gap region 210, the average gap distance between hub 202 and sleeve 205 is generally increased relative to bearing region 217 to reduce power consumption on the motor. The larger gap distance, however, may allow hub 202 to tilt when experiencing a moment force leading to potential damage or wear to the interfaces or joints between hub 202, shaft 220, sleeve 205, and the like. Accordingly, in one example, support pads 250, 251 are included in the large gap region 210 to provide localized narrow gap distance regions to support hub 250 in response to a moment load. For example, pads 250, 251 provide a narrow gap region adjacent to or proximate a maximum radial distance of axial gap 218, which may reduce the tilt in hub 202 in response to a moment load. Further, pads 250, 251 are localized narrow gap regions in an otherwise large gap region disposed outside (i.e., greater radial distance) bearing region 217 so as to draw reduced power compared with a circumferential narrow gap region around bearing region 217.

FIG. 2b illustrates a plan view of the lower surface of hub 202 (the surface facing axial gap 218) including exemplary bearing region 217 and pads 251, 252 in greater detail. Generally, the shaded portions show regions of lower elevation relative to the unshaded portions, e.g., the shaded portions are recessed from a substantially planar surface of the member, where grooves 284 are etched into planar surface 282 and pads 250, 251 are elevated above recessed regions 254. With the surface of hub 202 placed in opposition to planar surface of sleeve 205, where opening 280 is included for attachment to screw 224 and/or shaft 220, the varying elevations create varying axial gap distances. It should be recognized of course, that the varying elevations may be achieved through various suitable material addition techniques as well as material subtraction techniques.

In this example, grooves 284 are disposed to form a thrust bearing in bearing region 217. The depth and shape of grooves 284 may depend on various factors known in the art, e.g., relating to desired pumping efficiency, average gap width, and the like.

In this example, pads 250, 251 are disposed at a radial distance greater than bearing region 217 and near or adjacent a radial maximum distance of axial gap 218 corresponding generally to the outer edge of sleeve 205, thereby providing support for deflection of hub 202 relative to sleeve 205. Accordingly, a substantial portion, and in most examples the majority of large gap region 210 is maintained at a large gap distance (e.g., is recessed) relative to bearing region 217, thereby providing a greater average gap distance than bearing region 217. The greater average gap distance may reduce power consumed by the motor, while still providing support to hub 202 through localized narrow gap distance regions, i.e., pads 250, 251.

Pads 250, 251 are shown in this example having different sizes, radial positions, and angles. In other examples, pads may include various shapes including square, circular, rectangular, curved, and the like. Additionally, pads may be slanted or curved, and may extend partially into bearing region 217 and/or extend to or near a maximum radial distance of axial gap 218. In some examples, one or more pads may be configured to generate pressure gradients in axial gap 218.

The elevation of pads 250, 251 may be equal to ungrooved portion 282 in bearing region 217, and the elevation of recessed region 254 may be equal to the grooved portion 284. The similar elevations may create similar gap distances with the opposing surface. In other examples, however, the elevations of various features, and the corresponding gap distances, may vary. For example, the elevation of pads 250, 251 may be greater than the elevation of ungrooved region 282 to create a more narrow gap associated with pads 250, 251 than ungrooved region 282 (or vice versa). Additionally, different pads may have different elevations, and a single pad may have an elevation that varies, e.g., with radial distance or the like.

Bearing region 217 (in particular, grooves 284) may be included on the lower surface of hub 202, the opposing upper surface of sleeve 205, or both. Additionally, pads 250, 251 may be included on the lower surface of hub 202, the opposing upper surface of sleeve 205, or both. Furthermore, pads 250, 251 may be included on the surface of hub 202 and bearing region 217 included on the opposing sleeve 207 surface, or vice versa (i.e., pads 250, 251 need not be on the same surface as grooves 284 forming bearing region 217).

It should be recognized that the groove patterns shown in bearing region 217 are illustrative only, and any single groove or multiple groove pattern is contemplated. For example, a single spiral groove, multiple grooves, symmetrical or asymmetrical chevron grooves, and the like may be used. A few exemplary groove patterns are illustrated in FIGS. 3b-3d, but these are not intended to be limiting.

Furthermore, various processing techniques may be used to form grooves in bearing region 217 and pads 250, 251 in large gap region 210. For example, the grooves and/or pads may be formed by machining, Electro Chemical Machine "ECM" processing, laser etching, chemical etching, or the like. In addition to material subtraction techniques, the various features may be achieved through various suitable material addition techniques such as casting, injection molding, and the like.

FIGS. 3a-3d illustrate various exemplary configurations support pads. The exemplas shown in FIGS. 3a-3d, as well as that of FIG. 2b, may be included on one or more opposing planar surfaces forming an axial gap of a fluid dynamic bearing system, and the examples are not limited to use with a hub and sleeve.

Figure 3A:
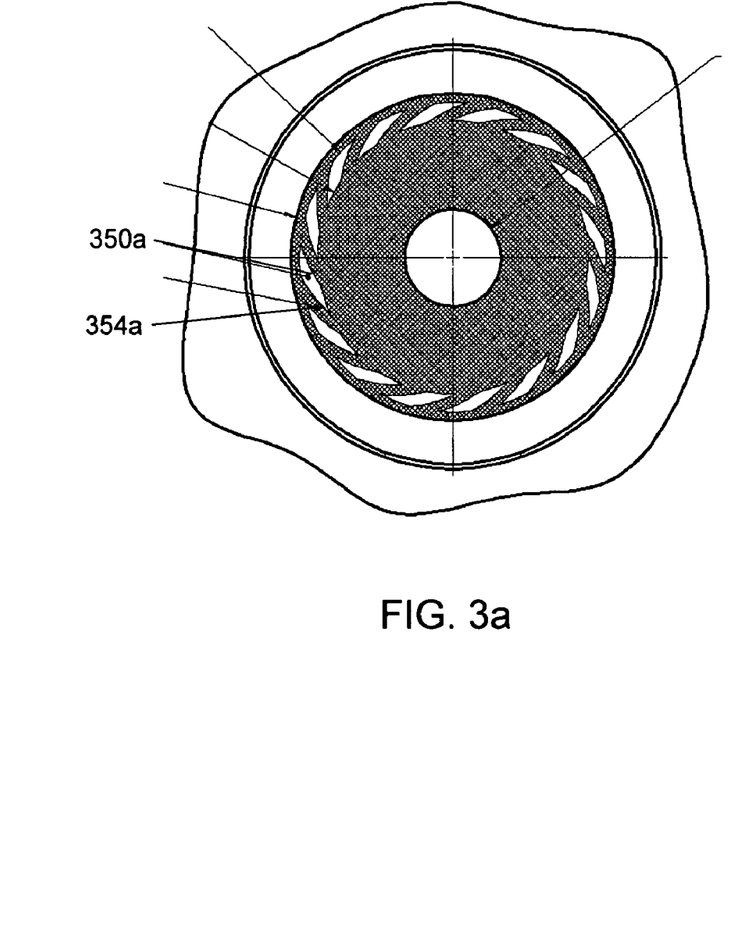
FIGS. 3a-3d illustrate exemplary support pads that may be employed on one or more portions of an exemplary motor.
Figure 3B:
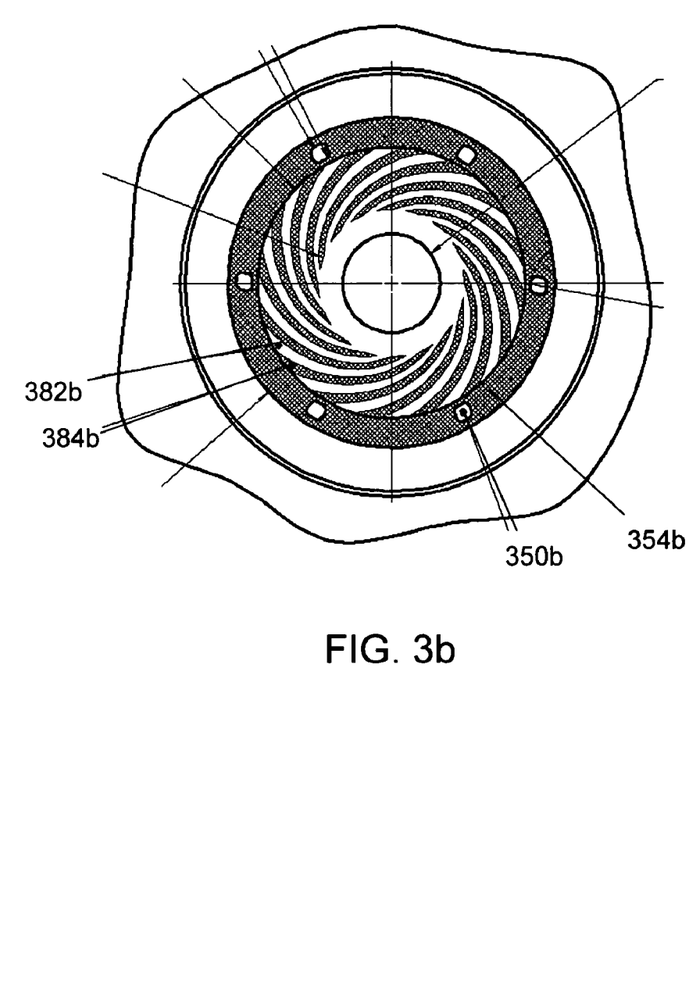
Figure 3C:
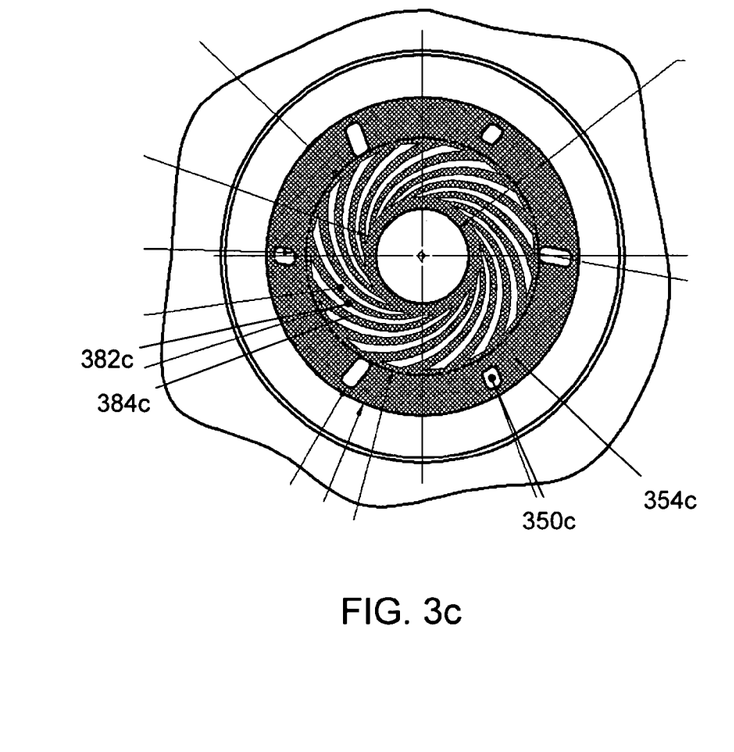
Figure 3D:
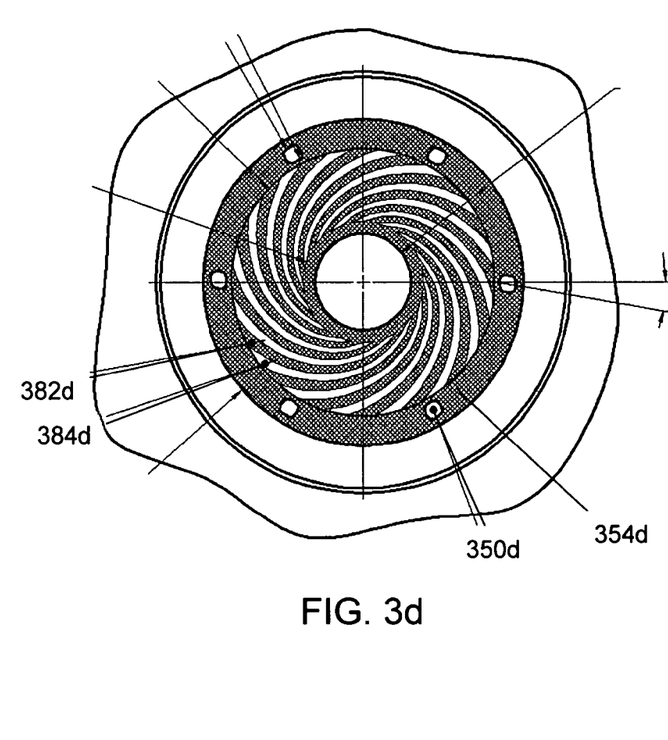

With regard to FIG. 3a, exemplary pads 350a are included on a recessed surface 354a absent a bearing region having a groove pattern. A bearing region having thrust grooves or the like may be included in an opposing surface. Additionally, pads 350a are curved and relatively angled in this example to provide, for example, a pressure gradient in the bearing fluid in addition to providing support as described previously.

FIGS. 3a-3d illustrate various other exemplary pads 350b-d and bearing regions having grooves 384b-d formed in surfaces 382b-d. In particular, it is noted that pads 350b-d may include various designs and configurations. For example, in FIG. 3b, square pads 350b are of substantially equal size and shape, and are symmetrically disposed within a circumferentially disposed recessed region 354b. Additionally, square pads 350b are angled with respect to a radial direction as shown.

FIG. 3c includes two pads 350c, 351c of varying size disposed circumferentially around a circumferentially disposed recessed region 354c in alternating large/small fashion. Additionally, pads 350c, 351c are angled with respect to a radial direction as shown.

FIG. 3d illustrates pads 350d similar to pads 350b of FIG. 3b and having a different bearing region of grooves 384d formed in surface 382d.

Figures 4A, 4B:
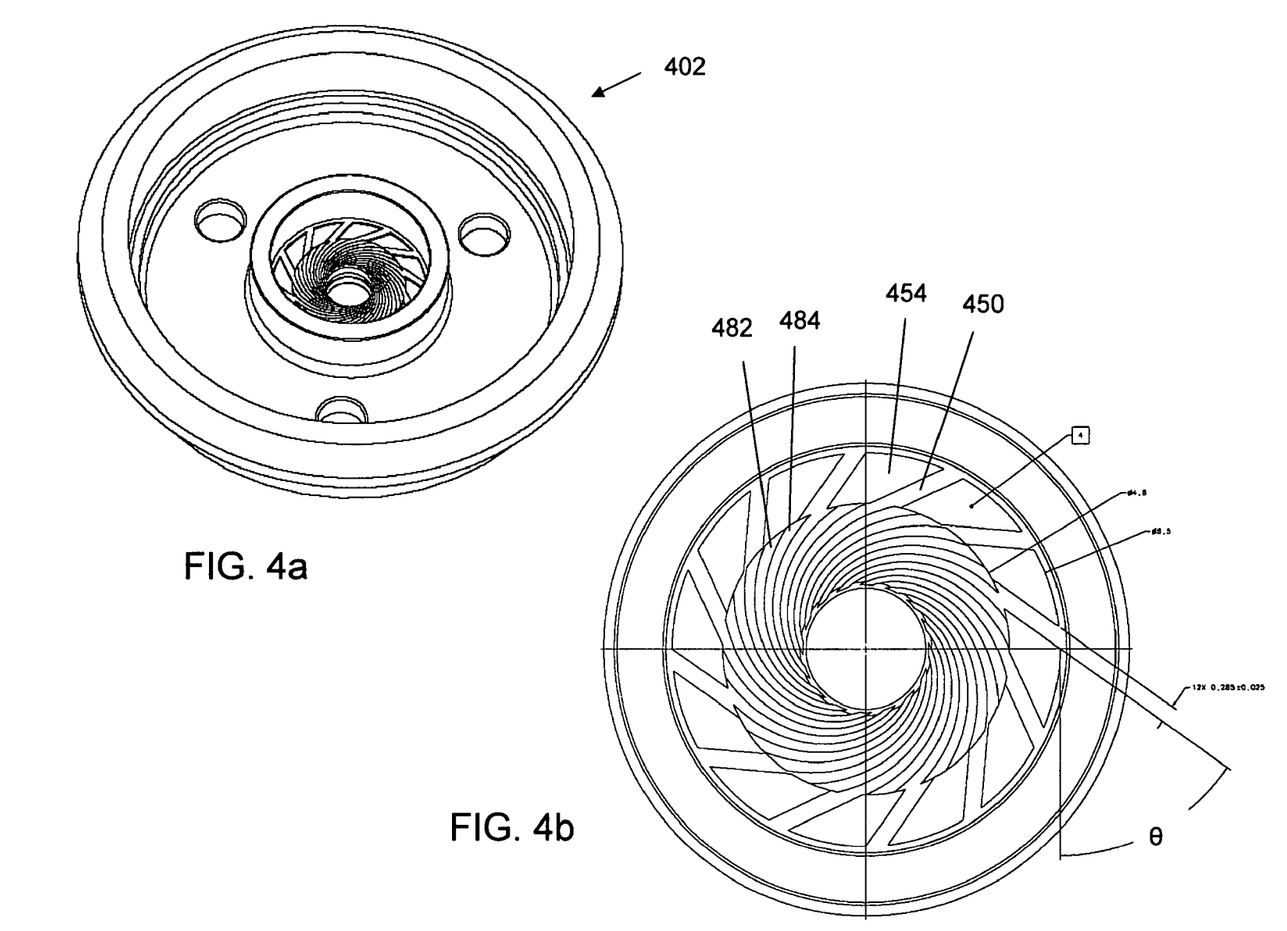
FIGS. 4a and 4b illustrate an exemplary hub portion and groove/support pad configuration for an exemplary motor.

FIGS. 4a and 4b illustrate an exemplary hub 402 and groove/support pad configuration for use with a motor (such as motor 200 shown in FIG. 2a). In this example 12 support pads 450 are included in a recessed region 454 disposed around a thrust groove region more proximate the axis of rotation. The thrust groove region of this example includes 16 spiral grooves 484 etched into surface 482. Support pads 450 are disposed at an angle θ as shown, where θ is approximately 55 degrees. In other example, θ may range from 0-90 degrees. Further, support pads 450 and surface 482 are shown at an equal elevation, whereas recessed region 454 and grooves 484 are recessed from that elevation.

Various motor and FDB aspects have been illustrated and described herein. One of ordinary skill in the art would understand that teachings related to each may be adapted to other designs. For example, a rotating shaft FDB motor has been shown and described, however, it should be understood that aspects of the examples described may be adapted to stationary shaft FDB motor designs. Also, it would be understood that certain components have been separately identified herein, but such identification does not imply that such components must be separately formed from other components. Similarly, components identified herein may be subdivided into sub-components in other designs. Additionally, illustrated features such as recirculation channels, bearing surfaces, pumping grooves, and the like may be disposed additionally or differently than presented in aspects herein.

Other modifications and variations would also be apparent to those of ordinary skill in the art from the exemplary aspects presented. By example, various exemplary methods and systems described herein may be used alone or in combination with various fluid dynamic bearing and capillary seal systems and methods. Additionally, particular examples have been discussed and how these examples are thought to address certain disadvantages in related art. This discussion is not meant, however, to restrict the various examples to methods and/or systems that actually address or solve the disadvantages.

We claim:

1. A fluid dynamic bearing motor, comprising:
    a hub and sleeve disposed for relative rotation about an axis of rotation and having opposing substantially planar surfaces defining an axial gap therebetween;
    at least one groove disposed on one of the opposing planar surfaces to form a bearing region, the at least one groove extending to a first radius from the axis of rotation; and
    a large gap region in the axial gap disposed at a radial distance greater than the first radius, the large gap region including at least one pad providing a localized narrow gap distance in the large gap region.

2. The system of claim 1, wherein a plurality of pads are disposed in the large gap region and symmetrically around the center of axis on at least one or the opposing planar surfaces.

3. The system of claim 2, wherein at least two of the plurality of pads vary in size or shape.

4. The system of claim 1, wherein the at least one pad includes from 3 to 12 pads disposed circumferentially around the axis of rotation.

5. The system of claim 1, wherein the at least one pad creates a pressure gradient in fluid disposed in the axial gap during relative rotation.

6. The system of claim 1, wherein the at least one groove and the at least one pad are formed on the same surface.

7. The system of claim 1, wherein the at least one groove and the at least one pad are formed on opposite surfaces.

8. The system of claim 1, wherein the at least one groove is disposed proximate a radial minimum of the axial gap and the at least one pad is disposed proximate a radial maximum of the axial gap.

9. The system of claim 1, wherein the at least one groove forms a thrust bearing.

10. A disk drive including a fluid dynamic bearing motor of claim 1.

11. A fluid dynamic bearing system, comprising:
    a first member and a second member disposed for relative rotation about an axis of rotation and having opposing substantially planar surfaces defining an axial gap therebetween, the axial gap having an outer radius;
    a bearing region disposed circumferentially around the axis of rotation; and
    a large gap region disposed circumferentially around the bearing region, the large gap region including at least one localized narrow gap region, the average gap distance of the large gap region being greater than an average gap distance of the bearing region.

12. The system of claim 11, wherein the large gap region is disposed proximate an outer radius of the axial gap.

13. The system of claim 11, wherein a plurality of pads are disposed in the large gap region and symmetrically around the center of axis on at least one or the opposing planar surfaces.

14. The system of claim 11, wherein the at least one pad includes from 3 to 12 pads disposed circumferentially around the axis of rotation.

15. The system of claim 11, wherein the at least one pad creates a pressure gradient in fluid disposed in the axial gap during relative rotation.

16. The system of claim 11, wherein the at least one groove and the at least one pad are formed on the same surface.

17. The system of claim 11, wherein the at least one groove and the at least one pad are formed on opposite surfaces.

18. A method for manufacturing a fluid dynamic bearing motor, comprising:
    forming at least one groove on a substantially planar surface of a first member,
    forming at least one pad on the surface of the first member or a surface of a second member, wherein
        the first member and the second member are adapted for relative rotation about an axis of rotation and defining an axial gap between the first surface and the second surface, and
        the pad is disposed at a radial distance greater than the at least one groove, thereby providing a localized narrow gap region.

19. The method of claim 18, wherein the at least one pad is formed by material removal techniques.

20. The method of claim 18, wherein the at least one pad is formed by electro chemical machining.

* * * * *